June 26, 1945. P. R. KALISCHER 2,379,158
PARTICLE SIZE DETERMINATION
Filed Feb. 3, 1943
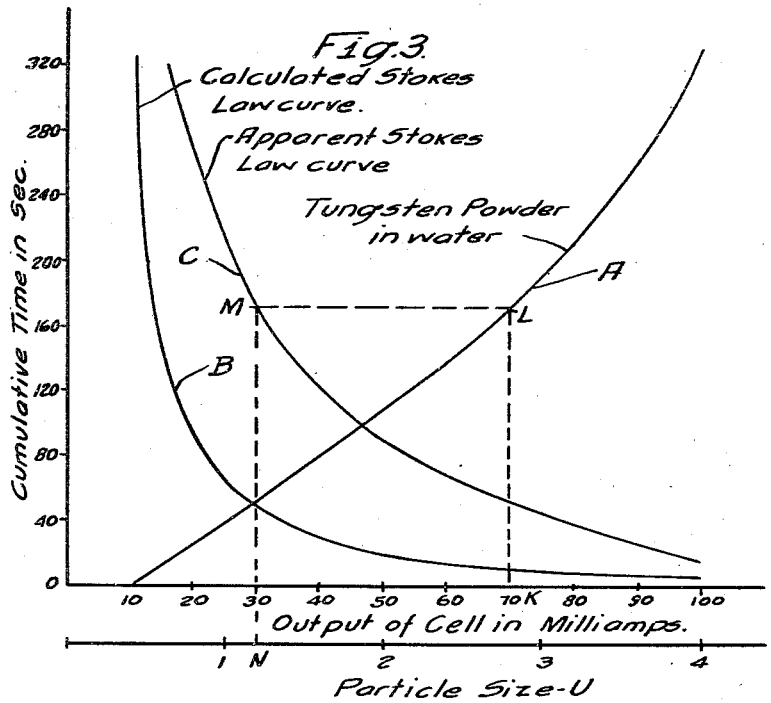
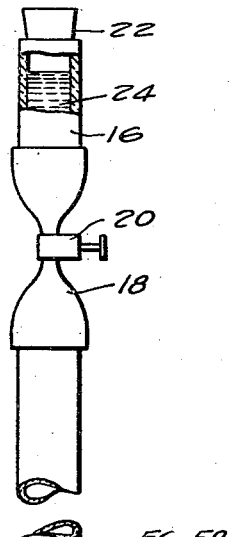
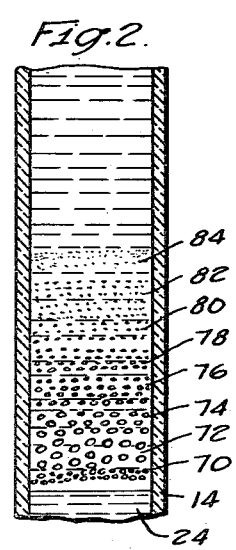
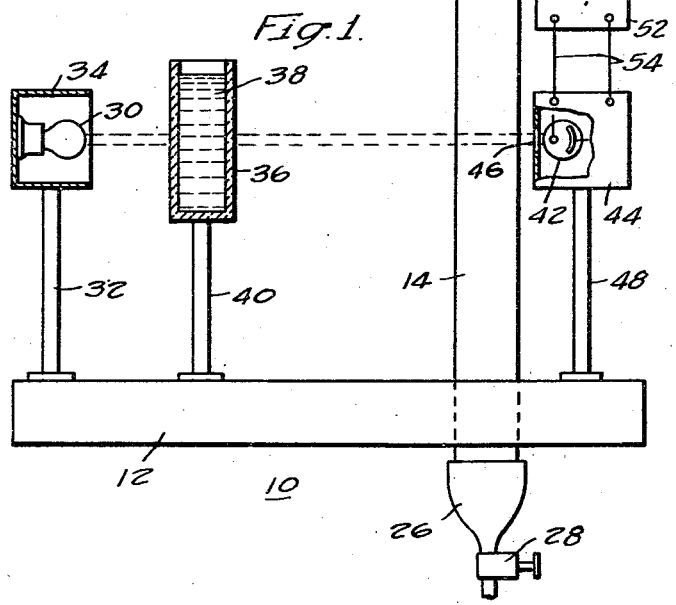
WITNESSES:
INVENTOR
Philip R. Kalischer.
BY
Ezra W. Savage
ATTORNEY Patented June 26, 1945

2,379,158

UNITED STATES PATENT OFFICE 2,379,158

PARTICLE SIZE DETERMINATION

Philip R. Kalischer, Wilkinsburg, Pa., assignor to Westinghouse Electric Corporation, East Pittsburgh, Pa., a corporation of Pennsylvania Application February 3, 1943, Serial No. 474,596

5 Claims. (Cl. 88—14)

This invention relates to the determination of the characteristics of the particles in a powdered material, particularly the relative number of particles in any unit mass of the powdered material.

In many industrial operations, research work and for test purposes, it is frequently desirable to have some information regarding the number of particles of any given size in a unit mass of powdered material. For instance, in the metallurgy of powdered metal, the proportions of particles of different degrees of fineness determine the tensile strength, density and ease of manufacture of compacts therefrom. Ceramic workers are interested in particle size, since the fineness of cements, clay particles, frits and the like determines the workability and the final product that will be obtained from any given pulverulent raw material.

While the art of particle size determination has an extensive literature and numerous devices are known for the purpose of determining particle sizes, as a general rule the tests are extremely lengthy to perform. In some cases particle size determination tests take several days to perform or, if more rapidly performed, the results are either only rough or not consistently accurate.

The object of this invention is to provide for rapidly and accurately determining the particle size characteristics of a powdered material.

A further object of the invention is to provide an apparatus for rapidly and accurately determining the particle size characteristics of a powdered material.

Other objects of the invention will in part be obvious and will in part appear hereinafter.

For a fuller understanding of the nature and objects of the invention, reference should be had to the drawing, in which:

Figure 1 is a view in elevation partly in section of a suitable form of the apparatus for carrying out the invention, Fig. 2 is a greatly enlarged fragmentary cross sectional view of a portion of the apparatus of Fig. 1, and Fig. 3 is a graph in which cumulative time is plotted against the output of a photoelectric cell in milliamperes as one ordinate and particle size as the other.

In determining the size and the number of the particles in a given powdered material, this invention is predicated on first causing a classification or gradation of the particles in a sample of the material to take place and thereafter determining the relative opacity of a unit volume of the particles of substantially similar size distributed in a dispersing medium whereby the number of particles of each given size in the powdered material may be found. Consequently, this invention differs radically from normal testing apparatus such as turbidimetric devices in which the relative opacity or light transmission is determined as a function of all the particles finer than a given size at the end of a given time interval.

The invention will be most readily understood by reference to Fig. 1 of the drawing in which the particle size determination apparatus 10 embodying the invention is illustrated. The apparatus 10 comprises a base member 12 upon which is vertically mounted a settling column 14. The column is transparent being preferably of glass or a translucent resinous material. The settling column is quite long for reasons which will be pointed out hereinafter. To the upper end of the column 14 a relatively small receptacle or reservoir 16 is operatively connected by means of a flexible tube 18 having a diameter at least equal to that of the column 14. For most purposes, the tube 18 may be of a rubber, though other resilient materials will be obviously suitable for this purpose. A pinch valve 20 is applied to the tube 18 to provide for stopping communication between the receptacle 16 and the column 14 and to permit communication between the receptacle and column when desired. A stopper 22 or similar closure means is applied to the other end of the receptacle 16. The receptacle 16 and the column 14 are filled with the same dispersing medium 24 whose characteristics will be detailed hereinafter. The bottom end of the column 14 may project below the base 12, suitable means such as a cement or the like being applied at the juncture to retain the column 14 in fixed relation to the base. A controllable closure is applied to the bottom of the column 14 to permit the emptying and cleansing of the column 14 and receptacle 16. One suitable means for accomplishing this function is a rubber tube 26 and a pinch clamp 28.

Adjacent the lower end of the column 14 is located a source of light such as a lamp 30 provided with a suitable shielding means 34 and supported on a standard 32. Between the lamp 30 and the column 14 a cell 36 filled with a suitable liquid 38 is disposed upon standard 40 in order to screen out any undesirable radiant heat which may be given off by the lamp and thereby reduce the possibility of convection currents being set up in the dispersing medium due to such heat. In line with the lamp 30 but located at the opposite side of the column 14, so as to respond to the transmitted light is a light sensitive cell 42. The light sensitive cell is preferably disposed within an enclosed chamber 44 having an aperture 46 of predetermined size for admitting light from the lamp 30 that has passed through the dispersing medium in column 14. The cell and chamber 44 are fixedly supported from a standard 48 attached to the base 12. Light falling on the cell 42 is converted to an electrical current which flows to an indicating device 52 through conductors 54. The indicating device is illustrated as a milliammeter having a pointer 56 readable against the dial 58. It will be appreciated that a recording milliammeter may be employed to produce a permanent record.

The column 14 may be disposed inside of a larger column filled with water to maintain a relatively constant temperature. In some instances the entire apparatus 10 may be disposed in an automatically controlled thermostat whereby testing may be carried out at constant temperatures.

In employing the apparatus 10, the column 14 and the cell 16 are filled with a dispersing medium having characteristics that will facilitate a rapid and effective test. One of the properties of the dispersing medium which are important for a satisfactory test and which have to be determined for any given powder is the relative wettability of the powder being tested by the dispersing medium. In many cases, water has proven to be entirely satisfactory on this count. In some cases the water or other dispersing liquid can be treated to give more consistent and accurate results by applying thereto a wetting agent, of which there are many available on the market, or a dispersing agent, likewise well known to those skilled in the art, or both. The addition of a wetting agent to water, or other dispersing medium, is beneficial in that the powdered material being tested may be rapidly wetted and dispersed in the water when a wetting agent is present. It is highly important that the powdered material under test be thoroughly wetted and dispersed if an accurate particle size determination is to be obtained. Clumps of particles will obviously lead to erroneous results.

Since both the density and the viscosity of the dispersing medium affect the time in which a test may be run as well as securing the most pronounced separation and classification of particles according to size, the medium should be selected to secure as low a viscosity as is reasonably obtainable and as great a difference in density as is reasonably obtainable as compared to the density of the powdered material under test. Acetone and water for example, have been employed in practicing the invention applied to powdered tungsten metal. The effect of wetting agents is quite pronounced with these media. When a wetting agent—0.5% isopropyl xanthate—is added to both the water and the acetone, the test time for water was reduced by about ¼, from 331 seconds to 250 seconds, while the acetone settling time was reduced to about $\frac{1}{10}$; from 1405 to 164 seconds. Furthermore, duplicate tests checked much more closely when the wetting agent was employed.

In employing the apparatus 10 for a test, a predetermined weight of the powdered material is placed within the receptacle 16, the pinch valve 20 closing the resilient tube 18 and the receptacle shaken from side to side on the resilient tube. In this way, a good dispersion should be rapidly secured. The pinch valve 20 is now opened in order to give an unobstructed passage from the receptacle 16 to the column 14. The wide diameter of the tube 18 prevents the relatively heavier dispersion from dropping in a fine stream and cutting through the medium in column 14, and causes an individual settling of the particles to occur. The lamp 30 is preferably turned on prior to this time to permit it to reach a steady state. A constant watt output transformer may be put in series with the light means 30 to insure a constant light output. The output from photosensitive cell 42 will be recorded as some high reading on the indicator 52 but this value is of no particular significance.

When the dispersion from the receptacle 16 is permitted to settle through the column 14 under the forces of gravity, it has been found that a peculiar phenomenon invariably takes place, namely, an initial fairly opaque layer of particles settles most rapidly through the column 14. Referring to Fig. 2 of the drawing, there is a sketch showing in exaggerated detail what appears to take place in the column 14. The dispersion is shown as settling with an initial fairly opaque layer 70 consisting of particles of various sizes. The largest particles of the dispersion shown as a layer 72 follow at a velocity slightly less than that of layer 70. Following at progressively slower velocities are layers of particles of progressively smaller size 74, 76, 78, 80, 82 and 84. When the layer 70 approaches that portion of the column 14 through which the light from lamp 30 passes to the photo-sensitive device 42, the transmission of light is greatly diminished and the light sensitive device will indicate a value just above zero transmission. Thereafter the passage of the successive layers 72 and 74, for example, permits a greater light transmission from lamp 30 whereby the indicating device will indicate a higher milliampere reading. Depending on the distribution of the various sizes of particles the output of the photo-sensitive cell in milliamperes will vary with the size and number of particles per unit volume of medium at this point. When the finest particles have settled out the light transmission through the column 14 will reach its original value.

It will be appreciated that the smaller the reservoir 16 is the more accurate will be the relative classification of the particles by the time the photocell zone of the column 14 is reached. The heavier particles will acquire a greater relative velocity when a constant velocity has been reached as compared to smaller particles in accordance with Stokes' law:

$$V = \frac{2g.d^2(D_P - D_L)}{9n}$$

V = velocity
$g$ = gravitational constant
$d$ = diameter of particle
$D_P$ = density of particle
$D_L$ = density of liquid
$n$ = viscosity of liquid.

Finer particles moving at a lesser velocity will be progressively separated from heavier particles. If sufficient distance of fall is permitted, there will be a classification of the particles from reservoir 16 into falling strata of progressively greater fineness from the bottom of column 14, the largest particles falling fastest and reaching the photocell zone first and the finer particles taking a longer time to reach the photocell zone. Thus in a cross section of the dispersing medium at the photocell zone the particles at any given time will be of closely similar size.

A curve may be plotted or recorded by a recording milliammeter as cumulative time against output of the photo-sensitive cell in milliamperes for any powder under test as shown in Fig. 3. Zero time is taken when the photo-sensitive cell indicates the minimum light transmission at the moment the relatively opaque layer 70 obstructs the passage of light to the cell. The curve A in Fig. 3 was plotted from a test with tungsten powder in which 98% of the particles had a size distribution of from 1½ to 4 microns. The dispersing medium was water with a wetting agent present.

While the curve A may have some value in indicating the relative particle size distribution, particularly by comparison with curves produced by testing known powdered materials of the same type, it is not entirely satisfactory for giving a clear picture of what size particles were present and in what number for each size. The apparatus 10 can be readily calibrated by the use of known size particles whereby the milliammeter reading at a given time will not only indicate the size of particles approaching the photocell at any given time but likewise their relative number.

For instance, powdered tungsten may be classified by known methods and separated into fractions each of a specific range of particle sizes. These fractions may be produced within fairly close limits with only a small portion of the particles being outside the limits. A classified powder so produced may be subjected to direct measurement and counting tests under the microscope or similar analysis to determine the number of particles per unit weight. For instance, a mixture of particles with a diameter of from 10 to 12 microns having been prepared, one gram is placed within the receptable 16 and the time determined when the particles reach and pass through the photo-electric cell zone and the milliammeter reading is taken. Another sample of particles of 8 to 10 microns in diameter may be subjected to similar tests. By using successive series of sizes, a complete curve may be plotted over a range of 1 to 40 microns; a portion of a curve for tungsten being shown at C in Fig. 3 of the drawing. Obviously curve C applies to only one density solid and only one dispersing medium for a given operating temperature. As a matter of interest, the Stokes' law curve for the same particles was calculated and plotted as B in Fig. 3. It is apparent that there is a considerable difference between the calculated and the experimentally determined curves.

Using curves A and C it is easy to find what size particles and their number on the curve A were passing the photoelectric cell at any given time. Thus at the point shown at L in Fig. 3, a horizontal line to M on Fig. 3 intersects the curve at the 1.2 microns particle size. This information permits the ready calculation of the number of particles of 1.2 microns size in the powdered mixture, a sample of which was employed in producing curve A. The following relationship has been found to hold:

$$n = \left(1 - \frac{I_0}{I}\right)\frac{1}{Lr^2}$$

$n$ = number of particles per cubic centimeter
$I_0$ and $I$ = currents of standard sample and of test
$L$ = light path in centimeters
$r$ = radius of particles in centimeters.

Knowing the light transmission value when a given weight of, for example, 1.2 microns particles alone were tested, a direct comparison may be made of the number of particles of 1.2 microns size in any other sample. The plotting of a number of points of this type for a plurality of particle sizes such as occur in a general mixture will give the curve A and from curves A and C on a chart a distribution curve may be prepared showing the number of particles of any given size for all the sizes in the particular powdered mixture. This latter distribution curve is of great importance in working with powdered materials and is obtained with the least time and effort from curves A and C plotted from a test in apparatus 10 as compared to any other system of determining particle size characteristics. Such a curve may be easily plotted by the use of the apparatus 10 in a test that will take only a fraction of an hour to run. The desired information is in a form that may be utilized and understood most readily by those working in this field.

The apparatus in this invention is particularly satisfactory for making tests of particles below 325 mesh. In particular, the apparatus may be employed with great savings in time for testing particles of from about 1 to 40 microns in size.

The reproducibility of results is high and closely consistent values are secured.

Since certain changes in the apparatus which embodies the invention may be made without departing from its scope and since certain changes in carrying out the process can be made, it is intended that all matter contained in the above description or shown in the accompanying drawing shall be interpreted as illustrative and not in a limiting sense.

I claim as my invention:

1. In an apparatus for determining the particle size characteristics of a powdered material, in combination, a relatively small storage receptacle for receiving a dispersed quantity of the powdered material in a dispersing medium, a settling column adapted to receive dispersing medium therein, means connecting the storage receptacle with one end of the settling column to provide for the admission of the dispersed material in the dispersing medium to one end of the column at a predetermined rate, a light source and a light sensitive device disposed about the settling column to indicate the relative light transmission through a cross-sectional portion of the column, the column being transparent at this point, the light source and light sensitive device being disposed at a sufficient distance from the admission end of the column so that the admitted particles of the powdered material, under the influence of settling forces, undergo a relative gradation resulting in closely similar sized particles being present in any cross-sectional volume of dispersing medium in the settling column when the particles settle past the portion through which light from the light source passes.

2. In an apparatus for determining the particle size characteristics of a powdered material, in combination, a relatively small storage receptacle adapted to contain a distribution of the powdered material in a dispersing medium, a settling column adapted to receive dispersing medium therein, a flexible connection for operatively associating the storage receptacle with one end of the settling column, valve means associated with the flexible connection to provide for the controllable admission of the distribution of material in the dispersing medium from the storage receptacle and through the flexible connection to one end of the column, the flexible connection being so arranged that the storage receptacle can be shaken to cause a uniform dispersion to be produced, a light source and a light sensitive device disposed about the settling column to indicate the relative light transmission through a cross-sectional portion of the column, the column being transparent at this point, the light source and light sensitive device being disposed at a sufficient distance from the admission end of the column so that the admitted particles of the powdered material, under the influence of settling forces, undergo a relative gradation resulting in closely similar sized particles being present in any cross-sectional volume of dispersing medium in the settling column when the particles settle past the portion through which light from the light source passes.

3. In an apparatus for determining the particle size characteristics of a powdered material, a base member, a vertical light transparent settling column supported by the base member and adapted to receive a dispersing medium, the upper end of the column having a flexible tube member disposed thereon, a relatively small receptacle attached to the flexible tube member, the tube member providing for communication between the receptacle and the column, a valve means to control such communication, the receptacle adapted to contain the dispersing medium and the powdered material dispersed therein, a light source and a light sensitive device supported on the base member at opposite sides of the settling column adjacent the bottom thereof, an indicating device operatively connected to the light sensitive device whereby to indicate the relative light transmission of the dispersing medium, the settling column being of a sufficient length that when the powder dispersion from the receptacle is admitted into the settling column a gradation of the particles according to size occurs by the time the particles reach the bottom portion of the column between the light source and light sensitive device.

4. In an apparatus for determining the particle size characteristics of a powdered material, a base member, a vertical light transparent settling column supported by the base member and adapted to receive a dispersing medium, the upper end of the column having a flexible tube member disposed thereon, a relatively small receptacle attached to the flexible tube member, the tube member providing for communication between the receptacle and the column, a valve means to control such communication, the receptacle adapted to contain the dispersing medium and the powdered material dispersed therein, the cross-sectional area of the flexible tube being closely similar to that of the column so that the material from the receptacle is admitted substantially simultaneously to the entire cross-section of the column, a light source and a light sensitive device supported on the base member at opposite sides of the settling column adjacent the bottom thereof, an indicating device operatively connected to the light sensitive device whereby to indicate the relative light transmission of the dispersing medium, the settling column being of a sufficient length that when the powder dispersion from the receptacle is admitted into the settling column a gradation of the particles according to size occurs by the time the particles reach the bottom portion of the column between the light source and light sensitive device, and means at the bottom of the column for venting the dispersing medium.

5. The method of determining the number of particles of a given size in a given powdered material which comprises, dispersing a predetermined weight of the powdered material in a small portion of a dispersing medium, placing the dispersion at the top of a settling column with the dispersing medium therein, the column being of relatively great length whereby as the particles settle relative classification of the particles according to size takes place, measuring the relative light transmission with time of a portion of the column as the classified dispersion settles down and comparing the light transmission at the elapsed time known to be required for settling of particles of the given size to the said portion of the column with the light transmission, measured under the same conditions, of a sample of the same material containing a known number of particles of the given size.

PHILIP R. KALISCHER.